United States Patent [19]

Singh

[11] Patent Number: 5,110,502

[45] Date of Patent: May 5, 1992

[54] METHOD OF SUPPRESSING FORMATION OF CONTRAILS AND SOLUTION THEREFOR

[75] Inventor: Surjit Singh, Williamsville, N.Y.

[73] Assignee: SCIPAR, Inc., Williamsville, N.Y.

[21] Appl. No.: 234,911

[22] Filed: Aug. 22, 1988

Related U.S. Application Data

[62] Division of Ser. No. 813,098, Dec. 24, 1985, Pat. No. 4,766,725.

[51] Int. Cl.⁵ .................... B01D 17/02; C09K 3/18
[52] U.S. Cl. ..................................... 252/319; 523/138
[58] Field of Search .............. 252/358, 321, 319, 70, 252/DIG. 14; 239/8; 523/138; 60/204, 264, 273, 282

[56] References Cited

U.S. PATENT DOCUMENTS

| | | | |
|---|---|---|---|
| 2,835,530 | 5/1958 | Schneider | 239/2.1 |
| 2,908,442 | 10/1959 | Stone | 239/2 |
| 2,962,450 | 11/1960 | Elod et al. | 252/319 |
| 3,096,290 | 7/1963 | Duane et al. | 252/70 |
| 3,289,409 | 12/1966 | Schirmer | 60/205 |
| 3,429,507 | 2/1969 | Jones | 239/2 |
| 3,517,505 | 6/1970 | Anderson et al. | 60/39.5 |
| 3,517,512 | 6/1970 | Anderson et al. | 60/264 |
| 3,537,900 | 11/1970 | Halbert | 134/42 |
| 3,608,810 | 9/1971 | Kooser | 239/2 |
| 3,608,820 | 9/1971 | Kooser | 239/2 |
| 3,630,913 | 12/1971 | Scott, Jr. et al. | 252/70 |
| 3,647,710 | 3/1972 | Stange | 252/319 |
| 3,722,815 | 3/1973 | Moore | 239/2 |
| 3,802,624 | 4/1974 | Kuhne et al. | 239/2 |
| 3,804,328 | 4/1974 | Lane et al. | 239/2 |
| 4,176,790 | 12/1979 | Osorio | 239/2 |
| 4,335,980 | 6/1982 | DePriester | 405/217 |
| 4,358,389 | 11/1982 | Konig-Lumer et al. | 252/70 |
| 4,362,271 | 12/1982 | Montmory | 239/2 |

*Primary Examiner*—C. Warren Ivy
*Assistant Examiner*—Catherine S. Kilby Scalzo
*Attorney, Agent, or Firm*—Joseph P. Gastel

[57] ABSTRACT

A solution for suppressing the formation of contrails from the exhaust of an engine including by weight between about 0.01% to 2.5% of the non-corrosive surfactant, between about 1% and 8% water, and between about 85% and 99% ethylene glycol. Another solution may include by weight a monohydric, dihydric or polyhydric alcohol in an amount of between about 85% and 99% and the non-corrosive surfactant in an amount of between about 0.01% and 8%. Still another solution may include an inorganic nucleating or hygroscopic salt, such as ammonium iodide, ammonium fluoride, silver iodide or calcium chloride in monohydric, dihydric or polyhydric alcohols and surfactant mixtures. Yet another solution may include an inorganic salt in monohydric, dihydric or polyhydric alcohols.

26 Claims, No Drawings

METHOD OF SUPPRESSING FORMATION OF CONTRAILS AND SOLUTION THEREFOR

This is a division of application Ser. No. 813,098 filed Dec. 24, 1985 now U.S. Pat. No. 4,766,725.

BACKGROUND OF THE INVENTION

The present invention relates to an improved method and composition for suppressing the formation of contrails from the exhaust of an engine.

By way of background, attempts have been made previously to suppress the formation of contrails from the exhaust of a jet engine. U.S. Pat. Nos. 3,517,505 and 3,517,512 teach the injection of chlorosulfonic acid into the exhaust of an engine to diminish the particle size of water below the visible range. However, this substance is extremely corrosive. U.S. Pat. No. 3,289,409 teaches the injection of carbon black into an aircraft engine effluent. Numerous other patents teach the dispelling of fogs and clouds by dispersing various compounds therein. However, insofar as known, the various compounds or components thereof which were used for fog dispersal were never considered for use in suppressing the formation of contrails from engines operating in cold environments at high altitudes.

SUMMARY OF THE INVENTION

It is one object of the present invention to provide an improved method of suppressing the formation of contrails from the exhaust of an engine in a highly efficient manner.

Another object of the present invention is to provide improved solutions for suppressing the formation of contrails from the exhaust of an engine and which can be produced simply and economically and which are not combustible or corrosive. Other objects and attendant advantages of the present invention will readily be perceived hereafter.

The present invention relates to a method of suppressing the formation of contrails from the hot exhaust gases of an engine operating in cold temperatures comprising the steps of providing in relatively sufficient proportions to effect hypernucleation of water in said engine exhaust a solution of a non-corrosive surfactant in a combined carrier and nucleating agent selected from the group of water soluble monohydric, dihydric, trihydric and polyhydric alcohols, and injecting said solution into said exhaust of said engine.

The present invention also relates to a hypernucleating solution for condensing water vapor in engine exhaust to particles having a size below the humanly visible range comprising in relatively sufficient proportions to effect said hypernucleation a non-corrosive surfactant in a combined carrier and nucleating agent selected from the group of water soluble monohydric, dihydric or polyhydric alcohols The present invention also relates to a method of preparing a contrail suppressing solution for effecting hypernucleation of the exhaust of an engine comprising the steps of dissolving a non-corrosive surfactant in a minimum amount of water while heating said water to obtain a molecular solution, heating a small amount of ethylene glycol to boiling, forming a combined solution of said molecular solution and said small amount of ethylene glycol and permitting cooling thereof, and adding a final amount of ethylene glycol to dilute said combined solution.

The present invention also relates to a method of suppressing the formation of contrails from the hot exhaust gases of an engine operating in cold temperatures comprising the steps of providing in relatively sufficient proportions to effect hypernucleation of water in said engine exhaust a solution of an inorganic nucleating agent and a combined carrier and nucleating agent selected from the group of water soluble monohydric, dihydric, trihydric and polyhydric alcohols, and injecting said solution into said exhaust of said engine.

The various aspects of the present invention will be more fully understood when the following portions of the specification are read.

The solution of the present invention includes a biodegradable low suds non-corrosive surfactant or synthetic detergent which will resist oxidation or decomposition in the hot exhaust gas atmosphere of an engine, which may be a gas turbine engine, turbojet engine, turbofan engine or rocket engine, and which will reduce the surface energy of water in the hot exhaust gas to promote hypernucleation. One such surfactant is obtainable under the trademark SPARKLEEN® and is manufactured by the Calgon Corporation of Pittsburgh, Pa. It is a sodium alkylsulfonate ($C_{12}$) and/or ($C_5$–$C_{16}$).

Other high temperature noncorrosive surfactants which can be used are known under the trademark ZONYL® of the E. I. duPont deNemours & Co. (Inc.). They are fluorosurfactants and the grades having the following structures have been found satisfactory:

ZONYL® FSE—$(R_f CH_2 CH_2 O)_{1,2} P(O)(ONH_4)_{2,1}$
ZONYL® UR—$(R_f CH_2 CH_2 O)_{1,2} P(O)(OH)_{2,1}$
ZONYL® FSN-100—$R_f CH_2 CH_2 O(CH_2 CH_2 O)_x H$
where $$R_f = F(CF_2 CF_2)_{3-8}$$

The ZONYL® FSE is an anionic liquid having 14% solids when diluted with 62% water and 24% ethylene glycol. It has a density of 1.12 g/mL. Its flash point by Pensky Martin's Closed Tester is greater than 93° C. (200° F.). Its aqueous surface tension at 0.01% solids is 27 dynes/cm (mN/m) at 25° C. and at 0.10% solids is 20 dynes/cm (mN/m) at 25° C.

The ZONYL® UR is an anionic paste having 100% solids. It has a density of 1.84 g/mL. Its flash point by Pensky Martin's Closed Tester is greater than 93° C. (200° F.). Its aqueous surface tension at 0.01% solids is 40 dynes/cm (mN/m) at 25° C. and at 0.10% solids is 28 dynes/cm (mN/m) at 25° C.

The ZONYL® FSN-100 is an nonionic thin paste having 100% solids. It has a density of 1.35 g/mL. Its flash point by Pensky Martin's Closed Tester is greater than 93° C. (200° F.). Its aqueous surface tension at 0.01% solids is 24 dynes/cm (mN/m) at 25° F. and at 0.10% solids is 23 dynes/cm (mN/m) at 25° C.

Other properties of the above grades of ZONYL® appear in the E. I. duPont deNemours & Co. (Inc.) publication entitled ZONYL® SURFACTANTS Product Information Bulletin which is further identified by E-50137, which is incorporated herein by reference.

Other surfactants which may be used include sodium dodecylsulfate or other alkyl, alkenyl or alkynal sulfates with carbon chains of four to sixteen carbon atoms. Still another class of surfactants include alkyl trimethylammonium salts or alkylsuphinyl ethanols.

The SPARKLEEN ® or ZONYL ® or other of the above-listed surfactants may be present in an amount by weight of between about 0.01% to 2.5%, and more preferably between 0.05% and 1% and most preferably between 0.1% and 0.2%, or the critical micelle concentrations.

Another component of the solution is a water miscible monohydric, dihydric, trihydric or other polyhydric alcohol or mixtures thereof. When the alcohol is ethylene glycol, the latter may be present by weight in an amount of between about 84% and 99%, and more preferably between about 88% and 98% and most preferably between about 95% and 98%. When the SPARKLEEN ® is used in solution with ethylene glycol, the solution also contains a small amount of water. The water may be present in an amount by weight of between about 0.01% and 15%, and more preferably between about 1.5% and 10%, and most preferably between about 1.7% and 4%. The water is necessary for dissolving the SPARKLEEN ® according to the following exemplary procedure. Into 5 grams of water, which is a small amount, 0.13 grams of SPARKLEEN ® were poured. The mixture was heated and was boiled for five minutes to produce a molecular solution which was clear. 10 milliliters of ethylene glycol were then heated to a boil and the boiled water solution of SPARKLEEN ® was poured into the boiled ethylene glycol while both were at boiling temperature. This amount of ethylene glycol may otherwise be within 5% and 20% of the total weight of the mixture. The resulting mixture was stirred thoroughly until clear and thereafter cooled. The resulting solution was then diluted to 100 milliliters by the addition of ethylene glycol. The foregoing amounts produced the most preferred solution containing by weight 0.13% SPARKLEEN ®, 1.87% water and 98% of ethylene glycol. The foregoing procedure is not required with the ZONYL ® because it is already in solution or will readily dissolve in the alcohol carrier. The water carrier may be unnecessary for surfactants which are completely soluble in alcohols, glycols, etc. Where the surfactant is completely soluble in the alcohol, no special procedure is required for the mixing operation. It is merely necessary to add the components and stir them.

Solutions were also formulated by mixing any one of the non-corrosive surfactants with either ethyl alcohol or methyl alcohol. In this respect, the ideal solution contained approximately 0.1% to 1.0% of the non-corrosive surfactant and 99% alcohol, either ethanol or methanol. In such solutions the non-corrosive surfactant may be present by weight in an amount of between about 0.01% and 8%, and more preferably in an amount of between about 0.07% and 4%, and most preferably in an amount of between about 0.1% and 2%. Either the ethanol or methanol may be present by weight in an amount of between about 85% and 99%, and more preferably in an amount of between about 92% and 99%, and most preferably in an amount of between about 97% and 99%. If desired, a small amount of water or glycerol may be added to the solution to make up a total of 100%. More specifically, where the surfactant is present in an amount of between about 0.01% and 8% and the ethanol or methanol is present in an amount of between about 85% and 99%, the water or glycerol can be present in an amount of between about 0.9% and 7%; where the surfactant is present in an amount between about 0.05% and 4% and the ethanol or methanol is present in an amount between about 92% and 99%, the water or glycerol may be present in an amount between about 3% and 4%; and where the surfactant is present in an amount of between about 0.1% and 2%, and the ethanol or methanol is present in an amount between about 97% and 99%, the water or glycerol may be present in an amount between about 0% and 2%. The combined carrier and nucleating agent may be any one of the monohydric, dihydric, trihydric or polyhydric alcohols or mixtures thereof to produce the total alcohol content.

The hypernucleating solution may also contain mixtures of any of the above-discussed surfactants such that the total amount of surfactant falls within the above ranges given for a single surfactant.

The nucleating ability of all of the above mentioned solutions is further enhanced by adding inorganic nucleating salts such as ammonium fluoride, ammonium iodide, ammonium chloride, calcium chloride or silver iodide. The added components listed above are hygroscopes or nucleating agents preferably with ice-compatible crystal structures and thermodynamic properties, such as volatilization, sublimation or boiling temperatures, solubility or surface energy reduction compatible with those of the surfactant mixtures of alcohols and/or glycols and/or polyols. Other compounds meeting any or all of the foregoing criteria can also be used as additives. The ability to form a eutectic is desirable but not necessary. A mixture may contain by weight 1% to 20% salt and more preferably may contain 2% to 12% of salt and most preferably may contain 3% to 7% of salt. The mixture would include a monohydric, dihydric, trihydric and/or a polyhydric alcohol or mixtures thereof. The weight percent of salt is also governed by its overall molecular weight, e.g., a much greater weight percent of silver iodide would be needed compared to ammonium fluoride because molar weight of silver iodide (AgI) is 235 while that of ammonium fluoride ($NH_4F$) is only 37. All of the above inorganic nucleating agents are completely soluble in the alcohol-surfactant mixtures and therefore no special procedure is necessary for mixing them.

When the inorganic nucleating agent is added in the foregoing amounts, the other components of the solution are reduced proportionately. For example, the surfactant may be present by weight in an amount of between about 0.01% and 7% and the combined carrier and nucleating agent may be present in an amount between about 79% and 98% when the inorganic nucleating agent is present in an amount of between about 1% and 20%. Furthermore, and more preferably, the surfactant may be present in an amount of between about 0.06% and 3.5% and the combined carrier and nucleating agent may be present in an amount of between 86% and 97% when the inorganic nucleating agent is present in an amount of between about 2% and 12%. Furthermore, and most preferably, the surfactant may be present in an amount of between about 0.1% and 2% when the combined carrier and nucleating agent is present in an amount of 92% and 96% when the inorganic nucleating agent is present in an amount of between 3% and 7%.

Any one of the above-mentioned inorganic salts may be added to any one of the above-mentioned alcohols or to mixtures thereof without the addition of surfactants. In this respect the salt could be present in an amount by weight of between about 1% and 20%, and more preferably between about 2% and 12%, and most preferably between about 3% and 7%. The remainder of the mixture would be any one of the above-mentioned alcohols, or mixture thereof, either full strength or diluted with water. The hypernucleating solution thus formed would be operative, but not as effective as mixtures containing a surfactant in the sense that much greater amounts would be required. No special procedure is necessary for combining the alcohol and inorganic salt other than mixing them.

The component of the solution to which the non-corrosive surfactant is added and which is both a carrier and a nucleating agent fall within the class of water soluble monohydric, dihydric, trihydric and polyhydric water miscible alcohols, which include the above-discussed ethanol, methanol and ethylene glycol and glycerol.

weight between about 1% and 25% of the weight of the jet fuel, and more preferably between about 3% and 15%. Actual tests were performed wherein the amount of hypernucleating agent of the present invention which was used was about 12% of the weight of the jet fuel which was consumed. The foregoing applies to hypernucleating solutions which do not include the above-mentioned inorganic nucleating agents. However, when hypernucleating solutions which include the inorganic nucleating agents are used, the amount required is reduced to about 40% of the amount of solutions which do not include the inorganic agent. The exact amount of hypernucleating agent which is used will be controlled by the pilot of the aircraft and it depends on plane altitude and various meteorological factors such as temperature, atmospheric pressure and relative humidity.

EXAMPLES OF SOLUTIONS WHICH PROVED SATISFACTORY IN THE LABORATORY TO HYPERNUCLEATE WATER VAPOR TO BELOW THE VISUALLY PERCEPTIBLE RANGE

PERCENT OF SOLUTION EXAMPLE

| | 1 | 2 | 3 | 4 | 5 | 6 | 7 | 8 | 9 | 10 |
|---|---|---|---|---|---|---|---|---|---|---|
| SPARKLEEN ® | 0.1 | 0.2 | 0.13 | 0.5 | 0.8 | 0.5 | 0.5 | 1.0 | 1.0 | .2 |
| Ethylene Glycol | 98 | 96.8 | 98.0 | 94.5 | 93.2 | — | — | 40.0 | 10.0 | 10.0 |
| Water | 1.9 | 2.0 | 1.87 | 5.0 | 6.0 | — | — | 9.0 | — | 5.0 |
| Ethanol | — | — | — | — | — | — | 99.5 | 20.0 | 30.0 | 5.0 |
| Methanol | — | 1.0 | — | — | — | 99.5 | — | 30.0 | 59.0 | 5.0 |
| Glycerol | — | — | — | — | — | — | — | — | — | 79.8 |
| ZONYL ® FSE | 0.05 | 0.1 | 0.15 | 0.5 | 0.8 | .05 | .05 | 1.0 | 1.0 | 0.05 |
| Ethylene Glycol | 99.5 | 99.5 | 99.5 | 99.5 | 98.2 | — | — | 40.0 | 10.0 | 10.0 |
| Water | .45 | 0.4 | 0.35 | 0 | 1.0 | — | — | 9.0 | — | 5.0 |
| Ethanol | — | — | — | — | — | 99.5 | — | 20.0 | 30 | 5.0 |
| Methanol | — | — | — | — | — | — | 99.5 | 30.0 | 59.0 | — |
| Glycerol | — | — | — | — | — | — | — | — | — | 79.9 |
| ZONYL ® FSN or ZONYL ® UR | 0.05 | 0.1 | 0.15 | 0.5 | 0.8 | .05 | .05 | 1.0 | 1.0 | 0.1 |
| Ethylene Glycol | 99.5 | 99.5 | 99.5 | 99.5 | 98.2 | — | — | 40.0 | 10.0 | 10.0 |
| Water | .45 | 0.4 | 0.35 | 0 | 1.0 | — | — | 9.0 | — | 5.0 |
| Ethanol | — | — | — | — | — | 99.5 | — | 20.0 | 30 | 5.0 |
| Methanol | — | — | — | — | — | — | 99.5 | 30.0 | 59.0 | — |
| Glycerol | — | — | — | — | — | — | — | — | — | 79.9 |

In use, the solution is preferably injected in vapor form into the exhaust gases of a jet engine, but it may be sprayed into the exhaust in liquid form. It may be formed into a vapor by suitable heating or spraying or by any other suitable mode of vaporization, such as air atomization. The exhaust gases leave the jet engine at about 950° F. (about 450° C.), and pass through an exhaust pipe before they enter a high altitude low pressure environment wherein the temperature is as low as −50° C. The hypernucleation solution is injected into the exhaust gases in the exhaust pipe. The injected solution of the present invention produces hypernucleation of the water vapor in the exhaust gases while they are in the exhaust pipe about to exit into the atmosphere because the injected solution lowers the surface energy requirements for droplet formation. The hypernucleation causes the formation of ice crystal structure sizes which are outside of the humanly visible range, namely, between 0.01 and 0.2 microns, when the jet engine operates in the cold low pressure environments which are experienced at high altitudes.

In laboratory testing it was found that the amount of hypernucleating solution of the present invention which can be injected into the engine exhaust gases may be by The testing of the various solutions set forth in the above tables was effected as follows: A chamber was cooled to −80° C. by a suitable refrigerant which was passed into a jacket surrounding the chamber. Nitrogen gas was fed through a coil immersed in a liquid nitrogen tank and cooled to −80° C. and then fed to the chamber. A combined steam and agent nozzle was provided which included an agent jet located concentrically within a steam jet such that the steam and agent were simultaneously sprayed into the −80° C. chamber containing nitrogen, with the agent being forced from its nozzle by a suitable pump. Ice crystals of a visually detectable size were not observed in the chamber, even though the steam nozzle exhausted 100% water into the −80° C. nitrogen atmosphere. In another series of tests the flow rate of cold gases were increased to Mach 0.6 level to simulate actual flights of a jet plane and complete suppression of contrail was observed at appropriate agent and engine power settings.

While preferred embodiments of the present invention have been disclosed, it will be appreciated that it is not limited thereto but may be otherwise embodied within the scope of the following claims.

What is claimed is:

1. A hypernucleating solution for condensing water vapor in hot engine exhaust gases passing into a cold environment to particles having a size below the humanly visible range comprising in relatively sufficient proportions to effect said hypernucleation of said exhaust gases a non-corrosive surfactant in a combined carrier and nucleating agent selected from the group of water soluble monohydric, dihydric, trihydric and polyhydric alcohols, and an inorganic nucleating agent, said non-corrosive surfactant being present in an amount of between about 0.01% and 7% by weight, and said combined carrier and nucleating agent being present in an amount of between about 79% and 98% by weight, and said inorganic nucleating agent being present in an amount of between about 1% and 20% by weight.

2. A hypernucleating solution as set forth in claim 1 wherein said non-corrosive surfactant is present in an amount of between about 0.06% and 3.5% by weight, and wherein said combined carrier and nucleating agent is present in an amount of between about 86% and 97% by weight, and wherein said inorganic nucleating agent is present in an amount of between about 2% and 12% by weight.

3. A hypernucleating solution as set forth in claim 1 wherein said non-corrosive surfactant is present in an amount of between about 0.1% and 2% by weight, and wherein said combined carrier and nucleating agent is present in an amount of between about 92% and 96% by weight, and wherein said inorganic nucleating agent is present in an amount of between about 3% and 7% by weight.

4. A hypernucleating solution as set forth in claim 1 wherein said inorganic nucleating agent is selected from the group of ammonium iodide, ammonium fluoride, silver iodide, ammonium chloride and calcium chloride.

5. A hypernucleating solution for condensing water vapor in hot engine exhaust gases passing into a cold environment to particles having a size below the humanly visible range comprising in relatively sufficient proportions to effect said hypernucleating of said exhaust gases a non-corrosive surfactant in a combined carrier and nucleating agent selected from the group of water soluble monohydric, dihydric, trihydric and polyhydric alcohols, said alcohol being selected from the group of ethanol, methanol, glycol, glycerol or mixtures thereof, and said alcohol being present by weight in an amount of between about 85% and 99% and said non-corrosive surfactant being present in an amount of between about 0.01% and 8%.

6. A hypernucleating solution as set forth in claim 5 wherein said alcohol is present by weight in an amount of between about 92% and 99% and wherein said non-corrosive surfactant is present in an amount of between about 0.07% and 4%.

7. A hypernucleating solution as set forth in claim 5 wherein said alcohol is present by weight in an amount of between about 97% and 99% and wherein said non-corrosive surfactant is present in an amount of between about 0.1% and 2%.

8. A hypernucleating solution for condensing water vapor in hot engine exhaust gases passing into a cold environment to particles having a size below the humanly visible range comprising in relatively sufficient proportions to effect said hypernucleation of said exhaust gases a non-corrosive surfactant in a combined carrier and nucleating agent selected from the group of water soluble monohydric, dihydric, trihydric and polyhydric alcohols, and water, said solution comprising by weight about 0.13% of said non-corrosive surfactant, about 1.87% water, and about 98% ethylene glycol.

9. A hypernucleating solution for condensing water vapor in hot engine exhaust gases passing into a cold environment to particles having a size below the humanly visible range comprising in relatively sufficient proportions to effect said hypernucleation of said exhaust gases a non-corrosive surfactant in a combined carrier and nucleating agent selected from the group of water soluble monohydric, dihydric, trihydric and polyhydric alcohols, and water, said solution comprising by weight between about 0.01% to 2.5% of said non-corrosive surfactant, between about 0.01% and 15% water, and between about 84% and 99% ethylene glycol.

10. A hypernucleating solution as set forth in claim 9 wherein said solution comprises a by weight between about 0.05% to 1% of said non-corrosive surfactant, between about 1.5% and 10% water, and between about 89% and 98% ethylene glycol.

11. A hypernucleating solution as set forth in claim 9 wherein said solution comprises by weight between about 0.1% to 0.2% of said non-corrosive surfactant, between about 1.7% and 4% water, and between about 95% and 98% ethylene glycol.

12. A hypernucleating solution for condensing water vapor in hot engine exhaust gases passing into a cold environment to particles having a size below the humanly visible range comprising in relatively sufficient proportions to effect said hypernucleation of said exhaust gases a non-corrosive surfactant in a combined carrier and nucleating agent selected from the group of water soluble monohydric, dihydric, trihydric and polyhydric alcohols, said alcohol being present by weight in an amount of between about 85% and 99% and said non-corrosive surfactant being present in an amount of between about 0.01% and 8%.

13. A hypernucleating solution as set forth in claim 12 wherein said solution includes an inorganic nucleating agent.

14. A hypernucleating solution as set forth in claim 13 wherein said inorganic nucleating agent is selected from the group of ammonium iodide, ammonium fluoride, silver iodide, ammonium chloride and calcium chloride.

15. A hypernucleating solution as set forth in claim 13 wherein said inorganic nucleating agent is present in an amount of between about 1% and 20% by weight.

16. A hypernucleating solution as set forth in claim 13 wherein said inorganic nucleating agent is present in an amount of between about 2% and 12% by weight.

17. A hypernucleating solution as set forth in claim 13 wherein said inorganic nucleating agent is present in an amount of between about 3% and 7% by weight.

18. A hypernucleating solution as set forth in claim 13 wherein said solution causes particles formed from said water vapor to be of a size of between 0.01 and 0.2 microns.

19. A hypernucleating solution as set forth in claim 12 wherein said alcohol is selected from the group of ethanol, methanol, glycol glycerol or mixtures thereof.

20. A hypernucleating solution as set forth in claim 12 wherein said alcohol is ethylene glycol.

21. A hypernucleating solution as set forth in claim 12 wherein said solution in use is injected in an amount of about 12% by weight into jet fuel.

22. A hypernucleating solution as set forth in claim 12 wherein said solution in use is injected in an amount of between about 1% and 25% by weight into jet fuel.

23. A hypernucleating solution as set forth in claim 12 wherein said solution in use is injected in an amount of between about 3% and 15% by weight into jet fuel.

24. A hypernucleating solution as set forth in claim 12 wherein said alcohol is present by weight in an amount of between about 92% and 99% and wherein said non-corrosive surfactant is present in an amount of between about 0.07% and 4%.

25. A hypernucleating solution as set forth in claim 12 wherein said alcohol is present by weight in an amount of between about 97% and 99% and wherein said non-corrosive surfactant is present in an amount of between about 0.1% and 2%.

26. A hypernucleating solution as set forth in claim 12 wherein said solution causes particles formed from said water vapor to be of a size of between 0.01 and 0.02 microns.

* * * * *